July 21, 1953 — F. P. EVERS — 2,646,280
TIGHT WIRE RIGGING
Filed Dec. 8, 1951 — 2 Sheets-Sheet 1
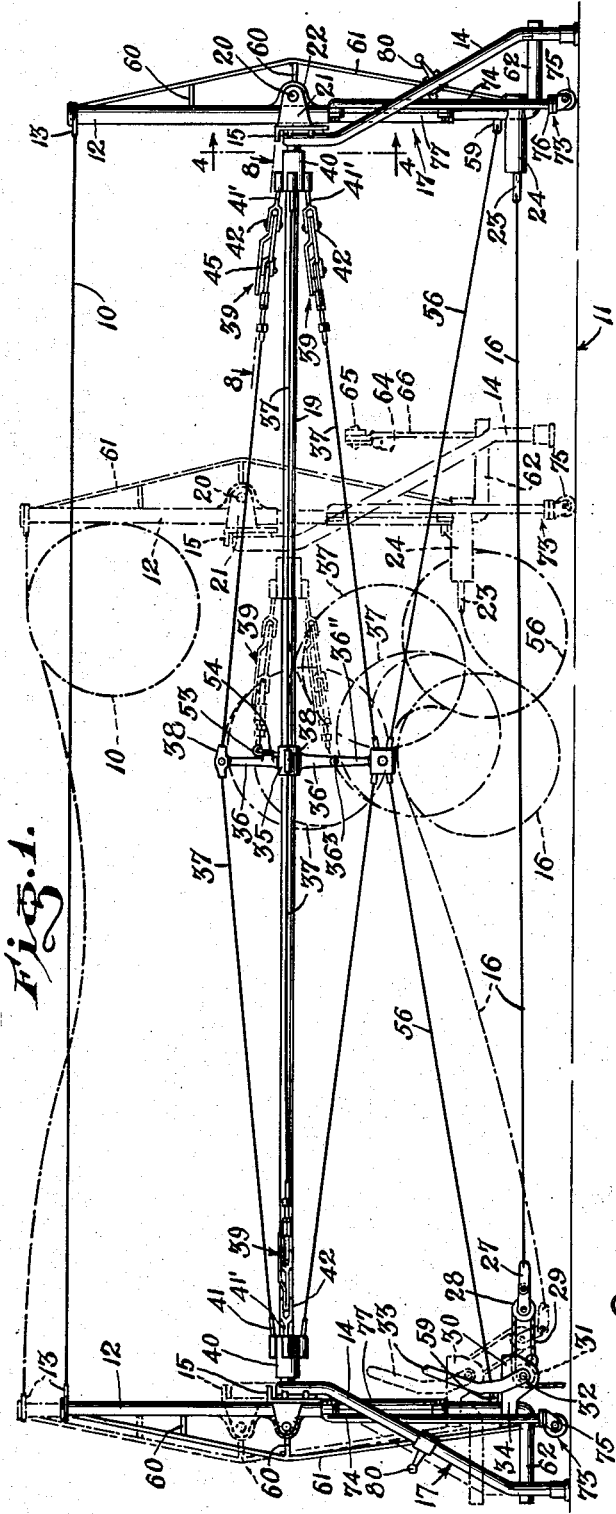
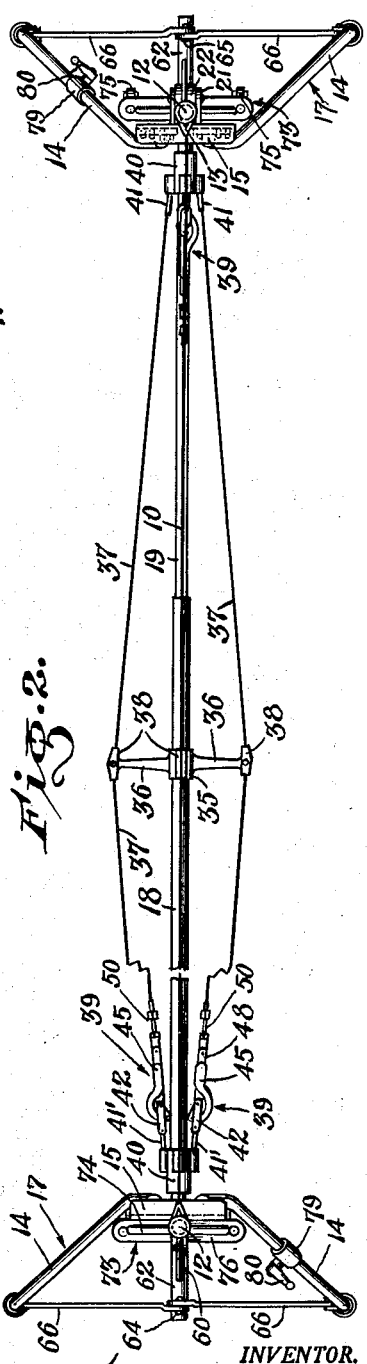
INVENTOR.
*Frank P. Evers.*
BY *Lynn Latta*
ATTORNEY.

July 21, 1953  F. P. EVERS  2,646,280
TIGHT WIRE RIGGING
Filed Dec. 8, 1951  2 Sheets-Sheet 2
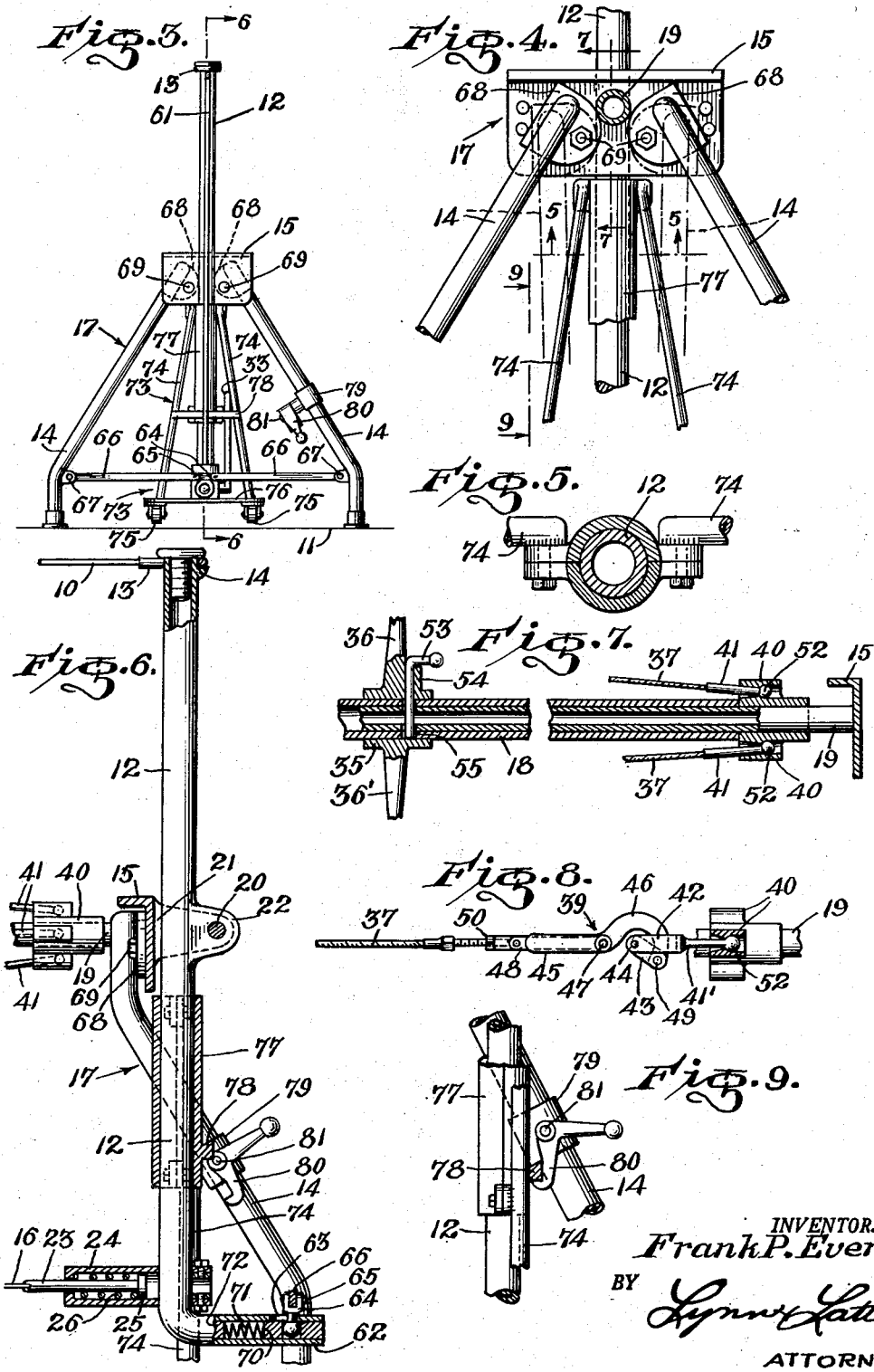
INVENTOR.
Frank P. Evers
BY
Lynn Latta
ATTORNEY.

Patented July 21, 1953

2,646,280

UNITED STATES PATENT OFFICE 2,646,280

TIGHT WIRE RIGGING

Frank P. Evers, Los Angeles, Calif.

Application December 8, 1951, Serial No. 260,648

10 Claims. (Cl. 272—21)

This invention relates to apparatus for use by tight wire performers, and has as its general object to provide a portable, self contained apparatus particularly adapted for interior use, e. g., upon a vaudeville stage, or in other performances within a building where it may be objectionable to attach guy wires to the stage or other parts of the building, for maintaining the tight wire under the required tension for supporting the performer or performers. More specifically, the invention has as subject to provide a tight wire apparatus having self contained bracing means eliminating the necessity for the use of guy wires making it possible for the apparatus to safely rest upon the stage or other supporting surface without any direct attachment thereto. Broadly, the invention is directed to the provision of the tight wire apparatus having a self-contained bracing means for use indoors or outdoors wherever it may be of advantage to use such an apparatus which does not have to be attached to the supporting surface by guy wires.

Other objects will become apparent in the ensuing specifications and appended drawings in which:

Fig. 1 is a side view of an apparatus embodying my invention;

Fig. 2 is a plan view of the same;

Fig. 3 is an end view of the same;

Fig. 4 is a detail sectional view taken on the line 4—4 of Fig. 1;

Fig. 5 is a detail sectional view taken on the line 5—5 of Fig. 4;

Fig. 6 is a detail sectional view taken generally as indicated by the line 6—6 of Fig. 3;

Fig. 7 is a detail sectional view taken generally as indicated by the line 7—7 of Fig. 4;

Fig. 8 is a detail sectional view taken generally as indicated by the line 8—8 of Fig. 1; and Fig. 9 is a detail sectional view, taken on line 9—9 of Fig. 4, illustrating the dolly locking mechanism.

As an example of one form in which the invention may be embodied, I have shown in the drawings a tight wire apparatus embodying self-braced means for supporting a tight wire 10 under tension, in a horizontal position elevated above a supporting surface which is indicated by the line 11.

The apparatus embodies a pair of supporting masts 12, to the upper end of which the wire 10 is securely attached, as by conventional stirrups 13 encircling the upper ends of masts 12, resting upon respective lugs 14 integral and projecting laterally from respective masts 12, and retained against slipping off the upper ends of the masts, by heads on said upper ends.

Each mast 12 is carried by a respective support 17 comprising a pair of legs 14 spreading downwardly from a bracket 15 to which the legs 14 are respectively pivoted at their upper ends. Brackets 15 are secured to the respective ends of a boom 18, 19 and are disposed in parallel vertical planes transverse to the axis of the boom, which may be considered as the main longitudinal axis of the apparatus. Boom 18, 19 includes a tubular shaft member 18 and a shaft member 19 telescoped into shaft member 18, the two shaft members collectively functioning as a compression member or strut for maintaining the brackets 15 in longitudinally spaced relation, resisting the pull of the tight wire 10 and a tensioning cable 16 both of which, in the apparatus as it is set up, are under tension and tend to draw the masts 12 toward each other. Masts 12 are pivotally connected to brackets 15 by pivots 20. Pivots 20 extend through a pair of laterally spaced ears 21 secured to a respective bracket 15 and a central ear 22 which is secured to a respective mast 12. Ears 21 and 22 are secured to the members 15 and 12 respectively in any suitable conventional manner, as by welding. Likewise, brackets 15 are secured to the ends of the respective shaft members 18, 19 in any suitable conventional manner as by welding. Tensioning cable 16 serves as the means for developing tension in tight wire 10. To this end, it is secured at one end (Fig. 6) to a plunger 23 slidably mounted in a cylinder 24 and having a head 25 which bears against a coil spring 26 engaged under compression between the head 25 and one end of cylinder 24. The other end of cylinder 24 is anchored to one of the masts 12. This is attained, in the particular apparatus herein shown, by providing the cylinder 24 with opposed openings through which masts 12 extend. Spring 26 is selected so as to provide a spring loading corresponding to the tension that is desired in the tight wire 10. The other end of tensioning cable 16 (Fig. 1) is anchored to a clevis 27 which carries a pulley 28. Pulley 28 forms part of a conventional wire tightener embodying a flexible element 29 such as a chain, anchored at one end to a jack body 30 in the form of a yoke, and having its other end gripped by a sprocket 31 mounted in yoke 30 by means of a shaft 32 and actuated by a handle or lever 33 through a conventional ratcheting drive and holding pawl arrangement well known in jacks and therefore not herein illustrated. Yoke 30 is anchored to the other mast 12, as by means of a tail portion 34 looped around said other mast.

Boom 18, 19 includes, in addition to the telescoping shaft members 18, 19, a central spider having a hub 35 secured on tubular shaft member 18 and a plurality of arms 36, 36' radiating upwardly, downwardly and laterally, the arm 36' being the downwardly extending one, being relatively shorter than arm 36, and having an extension arm 36" pivoted thereto at 363. Two sets of four guy wires each are attached to respective fittings 38 on the ends of arms 36 and to a fitting 38' on the end of arm 36". Alternate guy wires 37 are provided with take-up connections, indicated generally at 39, joining their outer ends to respective hubs 40 which are secured to the outer ends of respective shaft members 18, 19. Intervening guy wires 37 are directly attached to hubs 40 by means of the end fittings 41 shown in detail in Figs. 7 and 8. Take-up connections 39 (Fig. 8) utilize a toggle principle. Each embodies a fitting 41', attached to a hub 40 and having a clevis or yoke portion 42. An arm 43 has at one end a hub provided with trunnions 44 journalled in the respective furcations of yoke 42. A lever 45 has an end portion 46 curved outwardly around the hub of arm 43, said lever being pivoted at 47 to a link 48 and having its end portion 46 pivoted, at 49, to arm 43. Takeup connection 39 is adapted to have an over-center operation in which, as viewed in Fig. 8, counterclockwise rotation of the lever 45 will rotate arm 43 past a "dead center" position (aligned with the axis of fitting 41' within yoke 42) to a point where arm 43 may rotate counterclockwise and attain a position extending from yoke 42 toward link 48, so as to relieve tension in the guy wire 37 to which link 48 is connected through the medium of a turn buckle, take-up adjusting device 50. In reestablishing tension in guy wire 37, rotation of lever 45 of Fig. 8 in a clockwise direction will effect the rotation of arm 43 clockwise from the extended position just described, back to the aforesaid "dead center" position of yoke 42 and in alignment therewith, and beyond said position to the position shown in full lines in Fig. 8, in which position the takeup connection 39 becomes locked as the result of engagement of arcuate portion 46 of the operating lever against the hub portion of arm 43.

Fittings 41, 41' may each embody a ball head 52 engaged in a socket 53 in hub member 40, to provide universal pivotal connections between guy wires 37 and hub 40.

Boom 18, 19 is collapsible to allow the apparatus to be collapsed, for transportation purposes, to a length approximately two-thirds its length when set up for use. A latch bolt 54, slidably mounted on upper spider arm 36, is engageable in apertures 55 in shaft members 18 and 19, to join the shaft members 19 together in a manner to take the compression load imposed thereon when the guy wires are tightened.

Additional guy wires 56 are each attached at one end to fitting 38' and at the other end to an ear 59 welded to the lower end of a respective mast 12.

Each mast 12 is of a truss construction embodying struts 60 secured to and projecting radially from masts 12 and tension elements 61 secured respectively to the upper and lower ends of masts 12 and bridging across struts 60 in diagonal directions such as to resist the loads against the upper and lower ends of masts 12 tending to bend them toward each other about pivots 20.

At the lower ends of the respective masts 12 are arms 62 extending horizontally and away from each other in the common vertical plane of masts 12. Each arm 62 has, near its outer end, an upwardly facing opening 63 (Fig. 6) adapted to receive a ball head of a male latch element 64 which is carried by a pivot 65 pivotally joining adjacent ends of a pair of braces 66 connecting the legs 14. Braces 66 are pivoted at 67 to legs 14 (Fig. 3). The upper ends of legs 14 are secured to face plates 68 (Fig. 4), which are pivoted, on pivots 69, to the inner face of a respective bracket 15 on axes parallel to the main longitudinal axis of the apparatus. A latching plunger 70 is adapted to yieldingly engage the ball head of latch element 64 under the thrust of a compression coil spring 71 disposed in the bore of arm 62 under compression between element 70 and an abutment 72. Plunger 70 cooperates with the remote side of opening 63 in yieldingly grasping the ball head of latch element 64 as indicated in Fig. 6. Opening 63 is sufficiently large so that ball head 64 may be withdrawn therethrough upon pressing latch plunger 70 back against spring 71. Conversely, latch element 64 may be attached to leg 62 by inserting it through opening 63 and pressing it downwardly against plunger 70 causing the latter to retract.

By separating the latching connection between element 64 and arm 62, and moving the joined ends of braces 66 upwardly, braces 66 will function with a toggle action to draw legs 14 toward each other in a compactly folded position, indicated in broken lines in Fig. 4. When attached to legs 62, latch elements 64 maintain braces 66 in their position shown in Fig. 3, bracing legs 14 in their spread position in which they support the respective masts 12 so as to maintain the tight wire 10 securely supported during a performance thereon.

Means is provided for supporting the apparatus for wheeling movement on a supporting surface, for transportation between the interior of a building and the vehicle used in transporting the apparatus from place to place. Such mechanism comprises a pair of dollies 73 each having a pair of legs 74 provided at their lower ends with respective casters 75, said lower ends of legs 74 being connected by a cross brace 76 and the upper ends being secured to a sleeve 77 that slidably receives a respective mast 12 for vertical movement thereon. Dollies 73 also include an intermediate cross bar 78, secured to and extending between legs 74 so that the dolly frame has the shape of a letter A. At least one leg 14 of each support 17 is provided with an abutment collar 78, secured thereto, the lower end of the collar 78 being adapted, when legs 14 are folded toward each other and mast 12 is lifted upwardly with reference to dolly 73, to engage immediately above cross bar 78, whereby legs 14 may transmit support from dolly 73 to mast 12. The engagement of cross member 78 by sleeve 79 is between dolly legs 74 and sleeve 77. The engagement of collar 78 with crossbar 77 may be locked by means of a latch element 80, pivoted at 81 to the sleeve 79 and adapted to engage beneath cross bar 78 as indicated in Fig. 9, thus to lock the dolly 73 in a downwardly projected position with reference to mast 12, in which it will support one end of the apparatus with legs 14 elevated from the supporting surface 11.

*Operation*

In the apparatus described above, as set up for use, the masts 12 are supported upon supports 17 in their spread positions indicated in Fig. 3, and the boom 18, 19, tight wire 10, and tensioning cable 16 are suspended between the masts 12. Boom 18, 19 functions to maintain the masts 12 spaced apart with tight wire 10 and cable 16 both under tension. Boom 18, 19 takes the full compression load imposed thereon by the masts 12, tending to move toward each other under the tension load in tight wire 10 and cable 16. Boom 18, 19 is braced by the guy wires 37 against buckling under this compression load. Any tendency of masts 12 to rotate about their own axes to whatever extent might be permitted by play in the pivotal connection 20, is rigidly prevented by the anchoring of the outer ends of arms 62 to the legs 14 through the braces 66. The braces have the additional function of bracing legs 14 against spreading farther apart under the downward load applied thereto especially when the weight of performers is imposed upon the tight wire.

Masts 12 are free to pivot about their pivots 20 in their common vertical plane, in response to increase in the loading of tight wire 10. Tight wire performers require a certain amount of vertical yieldability or "spring" in the tight wire when performing thereon. This is particularly true when a performer is dancing or performing somersaults, so that his weight is temporarily removed from the wire and then imposed thereon with considerable momentum. Under these conditions, the wire must yield downwardly or it is likely to snap. Accordingly, the tensioning cable 16, with its yielding connection to one of the masts through spring 26, provides for spreading of the lower ends of masts 12 to allow the upper ends thereof to move toward each other in response to downward deflection of tight wire 10. Such spreading movement of the lower end of masts 12 will of course result in compression of spring 26, and with increasing compression, its load will increase, such being the spring rate characteristic of a coil spring. Thus there will be a gradual increase in the load in tight wire 10 such as to absorb the increases in the loading of the tight wire by the weight of the performer when dancing or jumping thereon. It will be apparent that in the pivotal movement of masts toward and from each other, just described, the position of boom 18, 19 and supports 13 will remain unaltered.

In collapsing the apparatus from the set up condition shown in Fig. 1, the jack 28—33 is released to release the tension in cable 16 and thus remove the compression load from boom 18, 19. The guy wires 37 may then be unloaded by actuating connection devices 39 to the tension releasing positions thereof. Legs 13 are then released from arms 62 (by releasing latching elements 64 from arms 62) and folded inwardly to positions where their abutment collars 79 may engage the respective bridging portions of cross bars 78, thus placing dollies 73 in the supporting positions. The latch 53 may then be released to allow telescoping of shaft member 19 into shaft member 18, whereupon the masts 12 may be simply pushed toward each other, after having been lifted to positions in which they are supported upon dollies 73. The mast is held against tipping over during this operation, and up to the point where it is supported upon dolly 73.

Pushing the masts 12 toward each other will bring the apparatus to the fully collapsed condition indicated by the broken lines in Fig. 1. Such condition, with reference to the full line position of Fig. 1, has been obtained by pushing the right hand mast toward the left hand mast, both masts being in elevated position supported upon dollies 73 as indicated in the dotted line showing. As the masts are thus pushed toward each other, all guy wires, the tight wire and cable 16 will sag to slack positions and the excess may be accommodated in any suitable manner which will be obvious.

In setting up the apparatus, a series of operations opposite to those described above, will be performed, the boom being first extended and locked in the extended position, the dollies then being released and the legs 14 spread apart and locked by attachment of latch element 54 to respective arms 62; the guy wires 37 then being tightened to rigidify the boom before the compressive load is imposed thereon, and, finally, the cable 16 being tightened to impose the desired tension upon tight wire 10.

I claim:

1. In a self-contained tight wire apparatus, a pair of vertical masts, a horizontal boom to the respective ends of which said masts are pivotally connected for pivoting movements in a common vertical plane coincident with the axis of said boom, a tight wire attached to the respective upper ends of said masts and adapted to be stretched therebetween as the result of application of a tension load between the lower ends of said masts, tensioning means attached to and connecting the lower ends of said masts, said tensioning means including a flexible tension element and means for imposing thereon a tension load selected to provide the desired tension in the tight wire, and supporting means upon which said masts are carried, said supporting means comprising individual supports for the respective masts.

2. Apparatus as defined in claim 1, wherein said means for imposing tension comprises take-up means operable for selectively improving and releasing the tension.

3. Apparatus as defined in claim 1, wherein said tensioning means includes a yielding spring connection between said flexible tension element and one of said masts, permitting tiltable yielding of the upper ends of the masts toward each other when weight is imposed downwardly upon said tight wire.

4. Apparatus as defined in claim 1, wherein said boom includes a pair of telescoping shaft members, latch means for latching said shaft members to each other in an extended position; a spider attached to said boom intermediate its ends in the extended position thereof, guy wires attached to said spider, and means attaching said guy wires to the respective ends of said boom, said means for at least some of the guy wires comprising wire tensioning devices.

5. Apparatus as defined in claim 1, wherein said supporting means comprises brackets to which said masts are pivoted, legs pivoted at their upper ends to respective brackets on axes parallel to the axis of said boom, and bracing means for releasably connecting the lower ends of said legs to the lower ends of said masts, to maintain said legs in downwardly spread relation.

6. Apparatus as defined in claim 1, wherein said masts at their lower ends are provided with arms projecting horizontally and away from each other, and wherein said supporting means comprises brackets to which said masts are pivoted, a pair of legs for each bracket, pivoted thereto at their upper ends, a pair of braces pivoted together at adjoining ends and having their opposite ends pivotally connected to said legs near the lower ends thereof, and latching means for connecting the adjoining ends of said braces to said arms for bracing said legs in downwardly diverging spread relation.

7. Apparatus as defined in claim 1, wherein said supporting means comprises brackets to which said masts are pivoted, a pair of legs for each bracket, pivotally attached thereto at their upper ends and having lower ends adapted for lateral swinging movement between generally parallel, folded positions and downwardly spreading supporting positions; means for connecting the lower ends of said legs to the lower ends of said masts for bracing the legs in said supporting positions, and a pair of dollies, one for each mast, each dolly including an A-shaped frame having at its upper end a slidable connection with a respective mast and having at its lower end a pair of laterally spaced casters, and means carried by said legs and engageable with said dolly frames in the folded positions of the legs, for transmitting support from said dollies to the respective masts.

8. Apparatus as defined in claim 1, wherein said supporting means comprises brackets to which said masts are pivoted, a pair of legs for each bracket, pivotally attached thereto at their upper ends and having lower ends adapted for lateral swinging movement between generally parallel, folded positions and downwardly spreading supporting positions; means for releasably connecting the lower ends of said legs to the lower ends of said masts for bracing the legs in said supporting positions, and a pair of dollies, one for each mast, each dolly including an A-shaped frame having at its upper end a slidable connection with a respective mast and having at its lower end a pair of laterally spaced casters, and means carried by said legs and engageable with said dolly frames in the folded positions of the legs, for transmitting support from said dollies to the respective masts, said last means including an abutment on a respective dolly frame, an abutment on a supporting leg for engagement with said dolly frame abutment, and a latching element on said leg, for latching the same to the respective dolly.

9. Apparatus as defined in claim 1, wherein said boom includes a pair of telescoping shaft members and latch means for latching said shaft members to each other in extended positions in which said boom is adapted to maintain said tight wire and said tensioning means both under tension, said tensioning means including a take-up means operable for selectively imposing and releasing the tension, said latch means being operable, when the tension is released, to release said shaft members for telescoping movement to collapse the apparatus to a shortened condition in which transportation thereof is facilitated.

10. Apparatus as defined in claim 1, wherein said boom includes a pair of telescoping shaft members and latch means for latching said shaft members to each other in extended positions in which said boom is adapted to maintain said tight wire and said tensioning means both under tension, said tensioning means including a take-up means operable for selectively imposing and releasing the tension, said latch means being operable, when the tension is released, to release said shaft members for telescoping movement to collapse the apparatus to a shortened condition in which transportation thereof is facilitated, and wherein said supporting means includes legs for supporting the apparatus in extended position for use; said apparatus further including dollies having roller supports for engaging a supporting surface, and including means connecting said dollies to said masts for relative vertical sliding movement, and means for latching said dollies in fixed relation to the masts, with said roller supports projecting below the level of the lower ends of said legs, for supporting the apparatus for transportation on a supporting surface.

FRANK P. EVERS.

References Cited in the file of this patent

UNITED STATES PATENTS

| Number | Name | Date |
|---|---|---|
| 159,301 | Carley | Feb. 2, 1875 |
| 1,419,191 | Acker | June 13, 1922 |

FOREIGN PATENTS

| Number | Country | Date |
|---|---|---|
| 24,741 | Denmark | July 2, 1919 |